United States Patent
Hasegawa et al.

(10) Patent No.: US 11,242,020 B2
(45) Date of Patent: Feb. 8, 2022

(54) VEHICLE BODY STRUCTURE

(71) Applicant: HONDA MOTOR CO., LTD., Tokyo (JP)

(72) Inventors: Atsushi Hasegawa, Wako (JP); Keiichiro Tsuji, Wako (JP); Takayuki Fujii, Wako (JP); Yusuke Miura, Yamato (JP); Tomohiro Shimizu, Tokyo (JP); Yumi Saito, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 114 days.

(21) Appl. No.: 16/804,649

(22) Filed: Feb. 28, 2020

(65) Prior Publication Data
US 2020/0307479 A1 Oct. 1, 2020

(30) Foreign Application Priority Data

Mar. 28, 2019 (JP) .............................. JP2019-063386

(51) Int. Cl.
*B60R 19/24* (2006.01)
*B60R 19/18* (2006.01)

(52) U.S. Cl.
CPC .............. *B60R 19/24* (2013.01); *B60R 19/18* (2013.01)

(58) Field of Classification Search
CPC ................................ B60R 19/24; B60R 19/18
See application file for complete search history.

(56) References Cited

U.S. PATENT DOCUMENTS 6,059,331 A * 5/2000 Mori ....................... B60R 19/18
293/132

FOREIGN PATENT DOCUMENTS

JP 2017-019458 1/2017

* cited by examiner

*Primary Examiner* — D Glenn Dayoan
*Assistant Examiner* — Melissa Ann Bonifazi
(74) *Attorney, Agent, or Firm* — Rankin, Hill & Clark LLP

(57) ABSTRACT

A vehicle body structure includes a bumper beam extending in a left-right direction, and left and right side members functioning as a frame member supporting both ends of the bumper beam. The bumper beam includes a connecting member that connects the both ends to suppress the extension between the both ends.

5 Claims, 5 Drawing Sheets

VEHICLE BODY STRUCTURE

INCORPORATION BY REFERENCE

The present application claims priority under 35 U.S.C. § 119 to Japanese Patent Application No. 2019-063386 filed on Mar. 28, 2019. The content of the applications is incorporated herein by reference in its entirety.

BACKGROUND OF THE INVENTION

Field of the Invention

The present invention relates to a vehicle body structure.

Description of the Related Art

Some vehicles such as an automobile has a vehicle body structure including a bumper beam that extends in a left-right direction, and a frame member that supports both ends of the bumper beam (for example, see Japanese Patent Laid-Open No. 2017-19458). Japanese Patent Laid-Open No. 2017-19458 discloses a structure in which a bumper beam on a rear side is curved like a bow and both ends of this bumper beam are connected independently to rear ends of left and right side members.

SUMMARY OF THE INVENTION

Incidentally, if an object collides with the bumper beam at a position deviated to the left or right, the bumper beam is displaced in the left-right direction and the load may not transmit to the side members as appropriate.

In particular, if the bumper beam is curved like a bow, for example, the bumper beam is easily displaced in the left-right direction depending on the direction where the load acts or the like.

In view of the above, an object of the present invention is to suppress, with a simple structure, the displacement along the direction where the beam member such as a bumper beam extends.

In order to achieve the above object, a vehicle body structure includes a beam member extending in a predetermined direction, and a frame member supporting each of a plurality of places of the beam member, wherein the beam member includes a connecting member that connects the plurality of places to suppress extension between these places.

In the above structure, the connecting member may be disposed between the places of the beam member and the frame member.

In the above structure, a part of the connecting member between the plurality of places may be offset toward the beam member or the frame member.

In the above structure, the connecting member may be disposed with a gap from the beam member, and the part may be offset toward at least one of the beam member and the frame member.

In the above structure, the connecting member may include a plurality of fixing parts that are fixed to the plurality of places, respectively, and a crosslinking part that crosslinks between the fixing parts, and the length of each fixing part may be longer than the beam member and the crosslinking part in a direction orthogonal to the predetermined direction.

In the above structure, the frame member may include a side member that extends in a direction orthogonal to the predetermined direction with a space in the predetermined direction, and the beam member may be fixed to the side member through the connecting member.

The beam member according to an aspect of the present invention includes the connecting member that connects the plurality of places to be supported by the frame members so as to suppress the extension between the places; thus, the beam member and the connecting member can be treated as one part and the structure is simplified. In addition, the displacement along the direction where the beam member extends can be suppressed by the connecting member.

DETAILED DESCRIPTION OF THE PREFERRED EMBODIMENTS

One embodiment of the present invention is hereinafter described with reference to the drawings.

Figure 1:
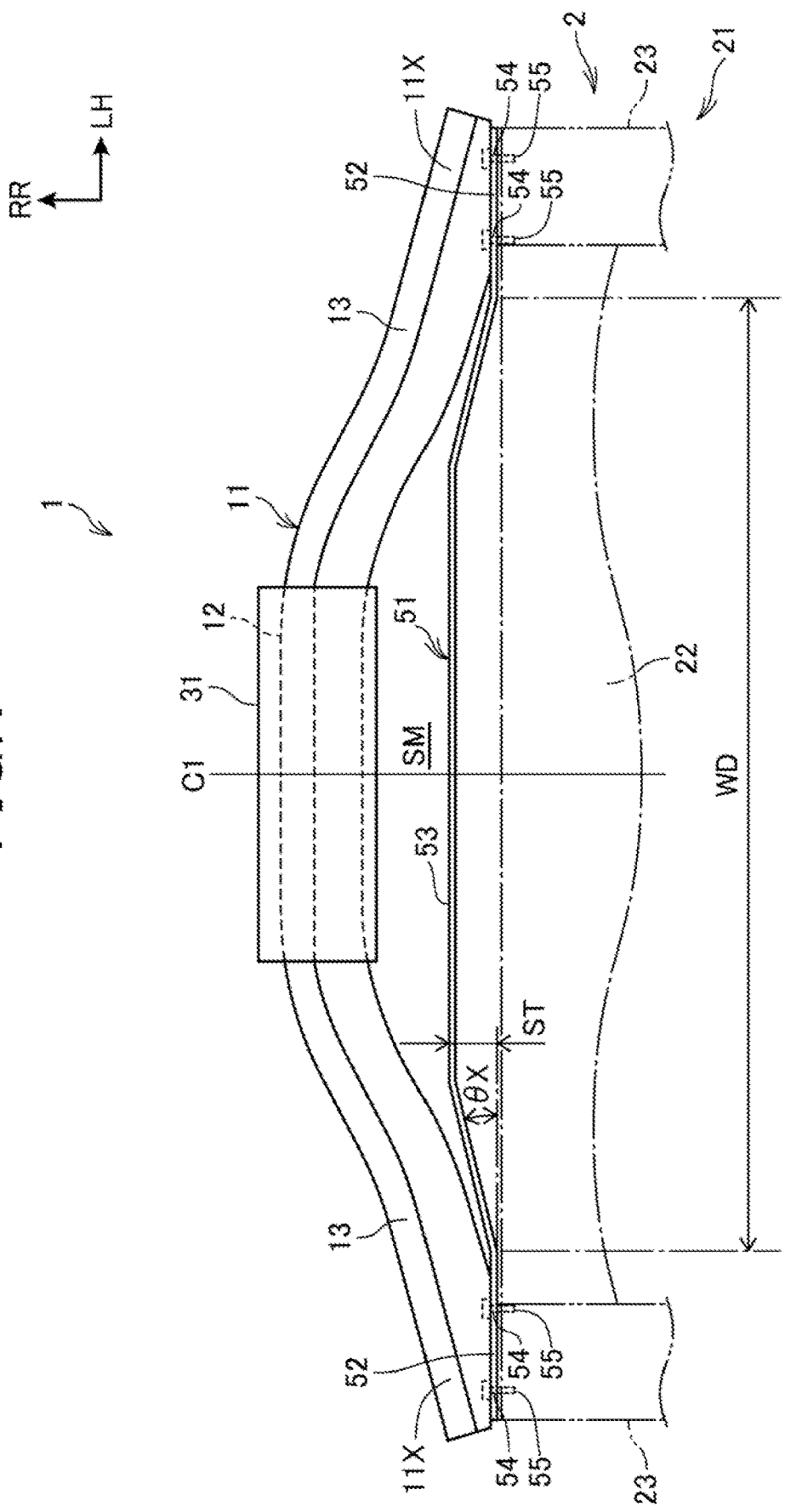
FIG. 1 is a diagram illustrating a vehicle body structure according to one embodiment of the present invention that is viewed from above.
Figure 2:
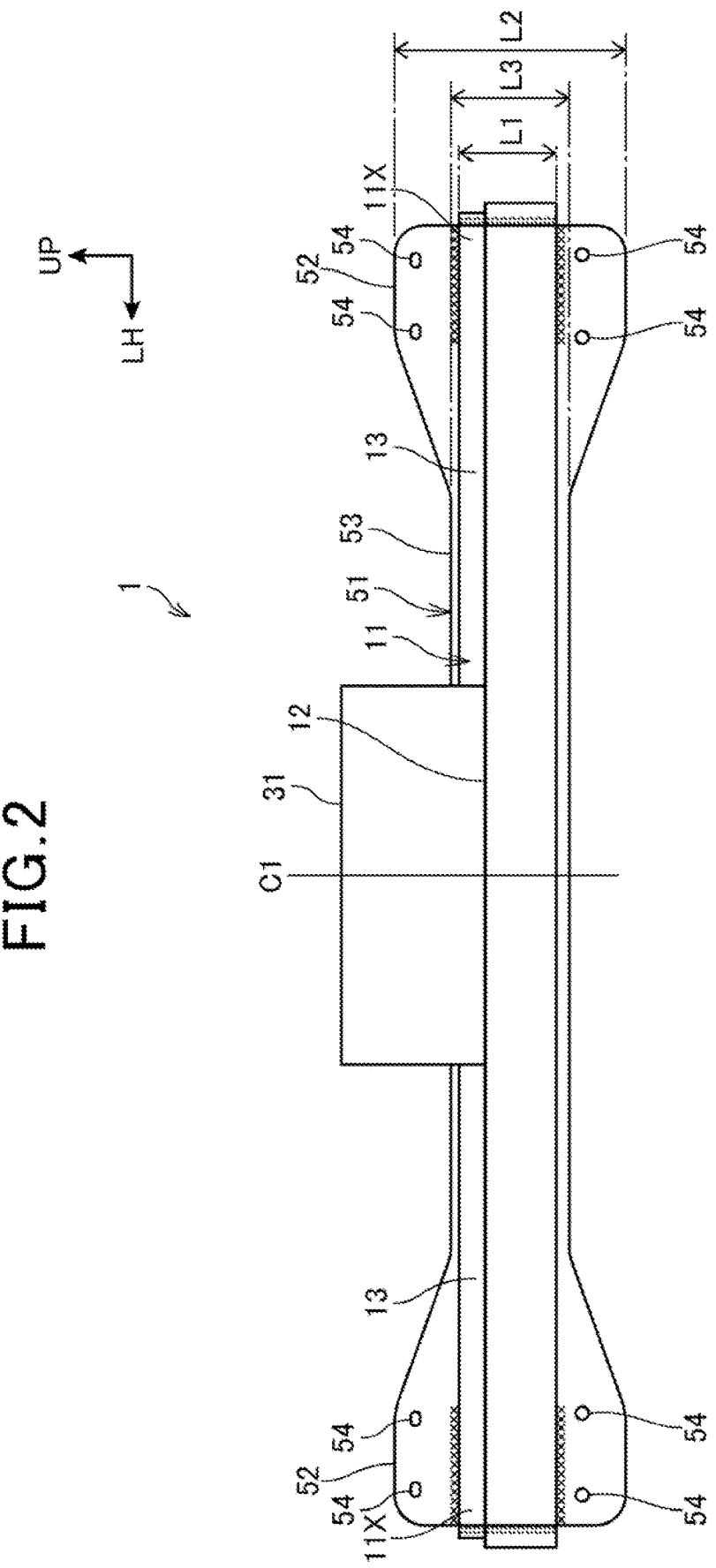
FIG. 2 is a diagram illustrating the vehicle body structure that is viewed from the front.

FIG. 1 is a diagram illustrating a vehicle body structure 1 according to the embodiment of the present invention that is viewed from above. FIG. 2 is a diagram illustrating the vehicle body structure 1 that is viewed from the front.

This vehicle body structure 1 is a bumper structure that is employed for a rear part of a vehicle body 2 of an automobile, and as illustrated in FIG. 1 and FIG. 2, includes a bumper beam 11 disposed in the rear part of the vehicle body and a vehicle body frame 21 to which the bumper beam 11 is attached. In FIG. 1 and FIG. 2, a reference symbol C1 denotes a center of the vehicle body 2 in the left-right direction, and hereinafter this center may be referred to as "left-right center C1" as appropriate. In this description, each direction is based on the vehicle body 2. In FIG. 1, FIG. 2, and the subsequent drawings, the rear of the vehicle body 2 is denoted by a reference symbol RR, an upward direction of the vehicle body 2 is denoted by a reference symbol UP, and a left direction of the vehicle body 2 is denoted by a reference symbol LH.

The vehicle body frame 21 includes a floor panel 22 forming a floor of the vehicle body 2, and left and right side members 23 that constitute a part of a skeletal member that is provided to the floor panel 22. The floor panel 22 includes a metal plate member extending in a cabin and below a rear trunk space, and FIG. 1 illustrates a floor panel part corresponding to a rear part of the rear trunk space.

The left and right side members 23 are formed of metal members extending in a front-rear direction with a space to the left and right (coinciding with a vehicle width direction). More specifically, each side member 23 is formed to have a rectangular tubular shape in a manner that steel plates bent to have an approximately C-like shape (also referred to as a gate shape) are bonded to each other. The left and right side members 23 are arranged in parallel to each other and bilaterally symmetrical about the left-right center C1. The shape, the structure, the arrangement, and the like of each side member 23 may be changed as appropriate, and other known shape and the like may be employed.

The bumper beam 11 is a beam member extending in the left-right direction, and is formed to have a rectangular tubular shape in a manner that a metal material such as aluminum alloy is extruded and molded. This bumper beam 11 includes an intermediate part 12 that forms an intermediate part in the left-right direction, and left and right outer edge parts 13 that extend from the intermediate part 12 to the outside in the left-right direction in an integrated manner, and is formed to have a bilaterally symmetric shape about the left-right center C1.

At the intermediate part 12 of the bumper beam 11, a beam attachment body 31 is attached. This beam attachment body 31 functions as a wall body that enlarges a surface to receive the load from an object behind the vehicle body as compared to the bumper beam 11 alone, and also functions as a load transmitting member that absorbs a part of the load and transmits the load to the bumper beam 11. The beam attachment body 31 is described below.

The intermediate part 12 and the outer edge part 13 of the bumper beam 11 are described.

Figure 3:
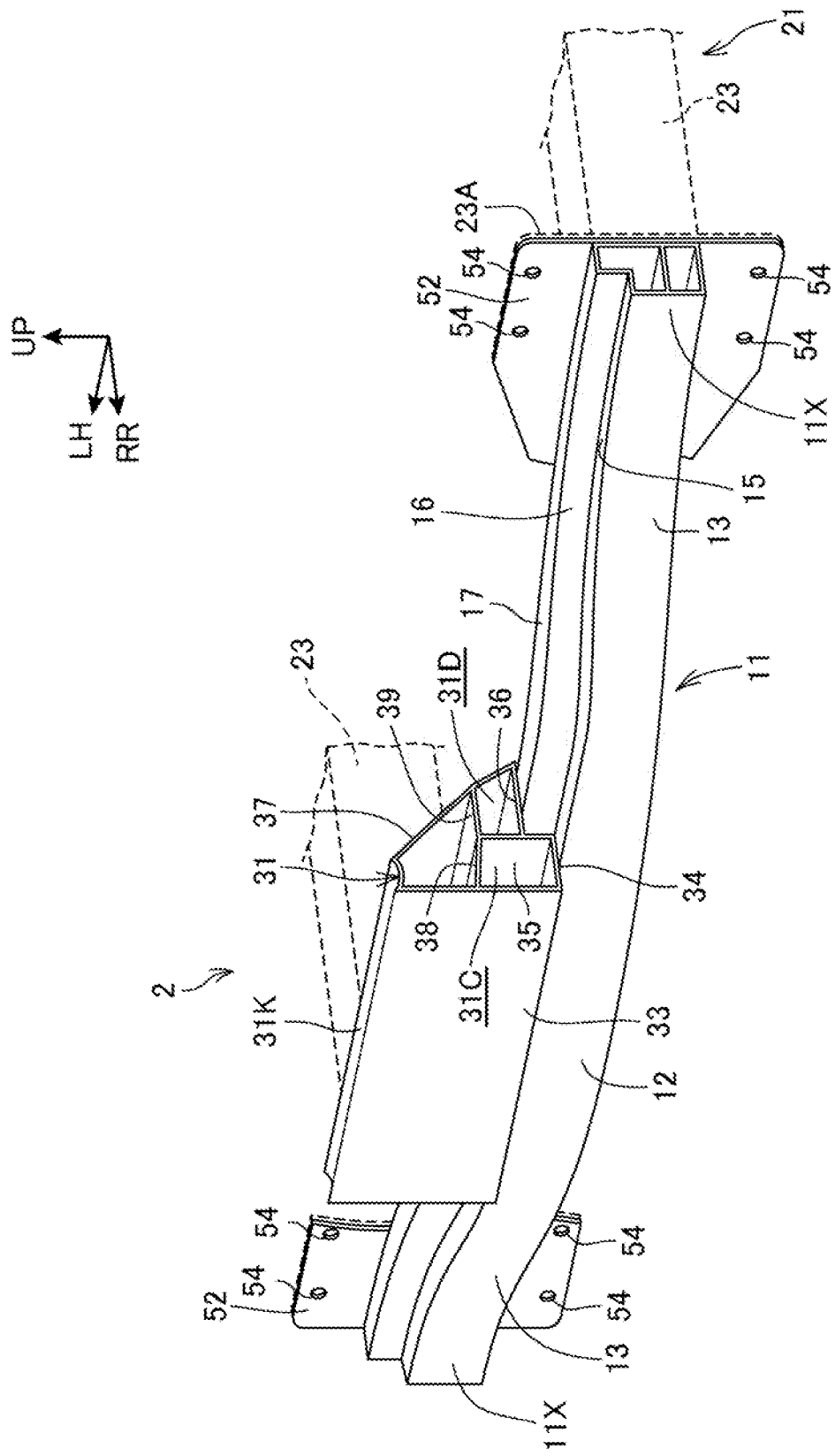
FIG. 3 is a perspective view illustrating a bumper beam together with a peripheral structure thereof.
Figure 4:
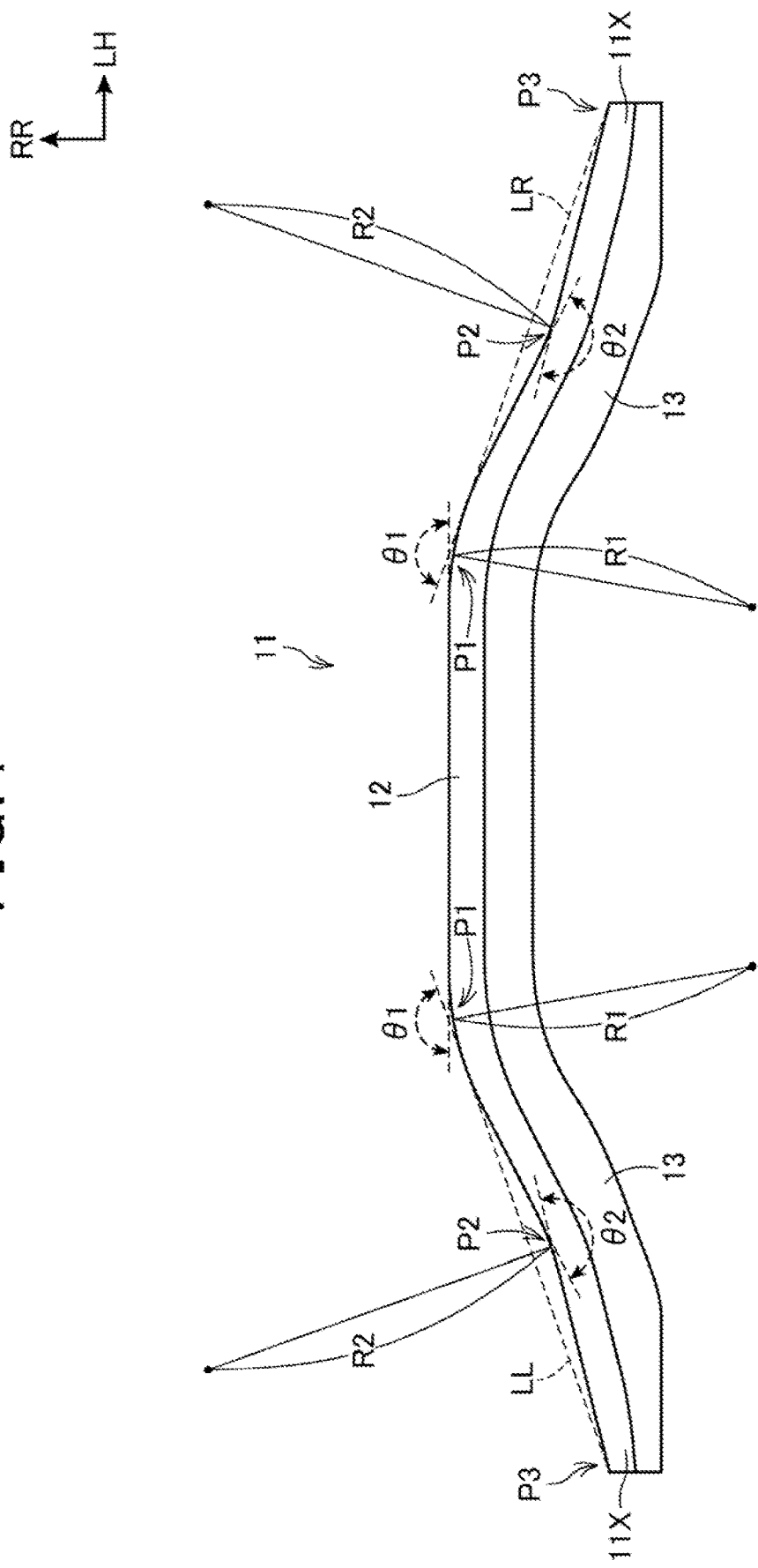
FIG. 4 is a diagram illustrating the bumper beam that is viewed from above.

FIG. 3 is a perspective view illustrating the bumper beam 11 together with a peripheral structure thereof. FIG. 4 is a diagram illustrating the bumper beam 11 that is viewed from above.

As illustrated in FIG. 3 and FIG. 4, the intermediate part 12 of the bumper beam 11 is the rearmost part of the bumper beam 11, in other words, the intermediate part 12 is the part that is the farthest from the vehicle body frame 21 to the outside and with this part, the object coming from behind is brought into contact before anything else. This intermediate part 12 is formed to have a shape extending linearly in the left-right direction.

As illustrated in FIG. 4, a border part between the intermediate part 12 and the outer edge parts 13 on the left and right sides is formed to be curved to project to the rear on the basis of a point P1 expressing a border position on a rear surface corresponding to a front surface of the bumper beam, in other words, formed to be curved to project to a side opposite to the vehicle body frame 21. The curved part based on this point P1 is curved along an arc, and a bending angle θ1 at the point P1 is preferably an angle that enables the gradual curve from the viewpoint of avoiding the excessive stress concentration when the object coming from behind the vehicle body collides with the position of the point P1. For example, the angle θ1 is preferably 140° or more and 160° or less, and is set at about 150° in the present embodiment. Note that the object from behind the vehicle body is the object that is predicted to possibly collide with the vehicle body 2, and corresponds to another automobile, for example.

The outer edge parts 13 on the left and right sides of the bumper beam 11 are formed to be curved to project forward, in other words, formed to project toward the vehicle body frame 21. These outer edge parts 13 are formed to be curved to project forward on the basis of a point P2 expressing a center position in a direction where the outer edge part 13 extends on the rear surface corresponding to the front surface of the bumper beam, in other words, formed to be curved to project toward the vehicle body frame 21.

The curved part based on this point P2 is curved along an arc, and a bending angle θ2 at the point P2 is set to be larger than the bending angle θ1 at the point P1. For example, the bending angle θ2 is preferably 160° or more and 180° or less, and is set to about 175° in the present embodiment. Thus, even if the object collides with the bumper beam 11 at a position offset to one of the left and right sides, the contact with the periphery of the point P2 of the outer edge part 13 on the left or right side can be suppressed and the load can be transmitted uniformly to the vehicle body frame 21.

In addition, a bending radius R2 at the point P2 is set to be larger than a bending radius R1 at the point P1. Thus, the concentration of the load near the point P2 can be suppressed as compared to the case in which the bending radius R2 at the point P2 is set to be smaller than the bending radius R1 at the point P1.

In the present embodiment, the outer edge parts 13 are curved to project toward the vehicle body frame 21; therefore, a left-right center part of the outer edge part 13 (hereinafter simply referred to as "center part") can be set closer to the vehicle body frame 21 than an outer shape line in the case where the outer edge part 13 has a straight line shape (straight lines LL, LR connecting between the point P1 and a point P3 on the outermost side of the outer edge parts 13 in FIG. 4). Thus, it is difficult for the object coming from behind to collide with the center part of the outer edge part 13.

For example, even if the object coming from behind collides with the intermediate part 12 at a position offset to one of the left and right sides (for example, at the position of the point P1) and the object rotates outward to the left or right side based on that position, the contact of the object with the center part of the outer edge part 13 becomes difficult. If the object that has rotated outward to left or right side collides with the center part of the outer edge part 13, the load from the object is relieved or absorbed by the deformation of the bumper beam 11; thus, the excessive deformation of the center part of the outer edge part 13 can be suppressed.

In addition, in the case where the border part between the intermediate part 12 and the outer edge part 13 is bent, the contact load that has acted on the intermediate part 12 may cause the stress concentration on the periphery of the point P1 that is positioned at the center of the border part. In the present embodiment, the curved part is curved along the arc based on the point P1; therefore, the stress concentration on the periphery of the point P1 can be suppressed and the excessive deformation of the outer edge part 13 can be suppressed further.

As illustrated in FIG. 1, the outer edge parts 13 on the left and right sides extend to rear ends of the left and right side members 23, respectively, and both ends 11X of the bumper beam 11 corresponding to outer ends of the outer edge parts 13 are supported by the left and right side members 23, respectively.

In the present embodiment, by forming the intermediate part 12 and the outer edge parts 13 of the bumper beam 11 as above, the stress concentration on the outer edge part 13 can be suppressed even if the object coming from behind has collided with the bumper beam 11, and the load can be transmitted uniformly to the left and right side members 23.

Incidentally, in the case where the load large enough to displace the bumper beam 11 in the left-right direction or the offset collision at high speed is assumed, for example, the bumper beam 11 may be displaced in the left-right direction and the load may not transmit to the left and right side members 23 as appropriate. In this case, the excessive deformation of the bumper beam 11 may occur.

In view of the above, in the present embodiment, a connecting member 51 (see FIG. 1 to FIG. 3) is provided. The connecting member 51 connects between the outer ends 11X of the bumper beam 11 on the left and right sides (hereinafter referred to as "both ends 11X") and suppresses the extension between the both ends 11X.

The connecting member 51 includes left and right fixing parts 52 that are fixed to the both ends 11X of the bumper beam 11 on the left and right sides, respectively, and a crosslinking part 53 that crosslinks between the left and right fixing parts 52. This connecting member 51 is formed of one metal plate with specified thickness, and is formed to have a bilaterally symmetric shape about the left-right center C1.

As illustrated in FIG. 2, the left and right fixing parts 52 are formed to have a plate shape with an up-down length L2. The up-down length L2 is larger than an up-down length L1 that is orthogonal to a longitudinal direction of the bumper beam 11. To the fixing parts 52, the both ends 11X of the bumper beam 11 are bonded through welding.

Note that the connecting member 51 is not limited to the structure formed of one metal plate and may be formed by bonding a plurality of metal members through welding or the like. For example, the connecting member 51 may be formed in a manner that two parts are split based on the left-right center of the connecting member 51 and these two parts may be bonded together through welding or the like. Alternatively, the left and right fixing parts 52 and the crosslinking part 53 may be formed as separate parts and these may be bonded together through welding or the like. In the case where the crosslinking part 53 is formed as a separate part, the plate thickness of the crosslinking part 53 may be larger than the plate thickness of the left and right fixing parts 52.

In FIG. 2, the place where the connecting member 51 and the bumper beam 11 are welded is shown by reference symbols X. As illustrated in FIG. 2, on rear surfaces of the left and right fixing parts 52, upper edges and lower edges of the both ends 11X of the bumper beam 11 are bonded through welding respectively, and side edges of the bumper beam 11 are bonded through welding to left and right side surfaces on the outside of the left and right fixing parts 52. Thus, the welding length is sufficiently secured and the bonding strength is sufficiently secured.

The left and right fixing parts 52 of the connecting member 51 includes a plurality of (four in the present embodiment) through holes 54 in a region not overlapping with the bumper beam 11. As illustrated in FIG. 1, fastening members (for example, bolts) 55 are inserted into these through holes 54 and by fastening each fastening member 55 to a flange 23A (see FIG. 3) provided to the side member 23, the bumper beam 11 is fixed to the side member 23.

Thus, by fixing the connecting member 51 to the side member 23, the bumper beam 11 is also fixed to the side member 23; therefore, as compared to the case in which the connecting member 51 and the bumper beam 11 are attached separately to the vehicle body frame 21, the attachment work is facilitated.

As illustrated in FIG. 3, the left and right fixing parts 52 are positioned between the bumper beam 11 and the side members 23, and also serve as the flange parts to fix the bumper beam 11 to the side members 23. Therefore, the flanges that have been conventionally provided to the bumper beam can be omitted and the number of parts can be reduced and the increase in weight can be suppressed, which are advantageous. In addition, by adjusting the thickness and the like of the left and right fixing parts 52, the strength necessary for the part where the bumper beam 11 and the side members 23 are connected can be secured easily.

Thus, in the present embodiment, the bumper beam 11 and the connecting member 51 can be treated as one part, and the attachment work can be simplified and the increase in number of parts and weight can be avoided easily.

Note that as the method of fixing the left and right fixing parts 52 to the side members 23, not just the fastening structure described above but also other known fastening structures or fixing methods other than the fastening structure may be employed. In addition, as the method of fixing the bumper beam 11 to the connecting member 51, not just a fusing method but also other known fixing methods such as a fastening structure may be employed.

As illustrated in FIG. 2, in the part where the left and right fixing parts 52 and the crosslinking part 53 are connected, the up-down length becomes narrower gradually toward the left-right center C1 until the up-down length becomes equal to an up-down length L3 of the crosslinking part 53. Note that the connecting member 51 according to the present embodiment has a vertically symmetric structure but other structures than the vertically symmetric structure may be employed.

The crosslinking part 53 is formed to have a plate shape extending in the left-right direction with the certain up-down length L3. By this crosslinking part 53, both ends 11X of the bumper beam 11 are connected through the left and right fixing parts 52. Thus, by the connecting member 51, the deformation including the extension between the both ends 11X of the bumper beam 11 can be suppressed.

Figure 5:
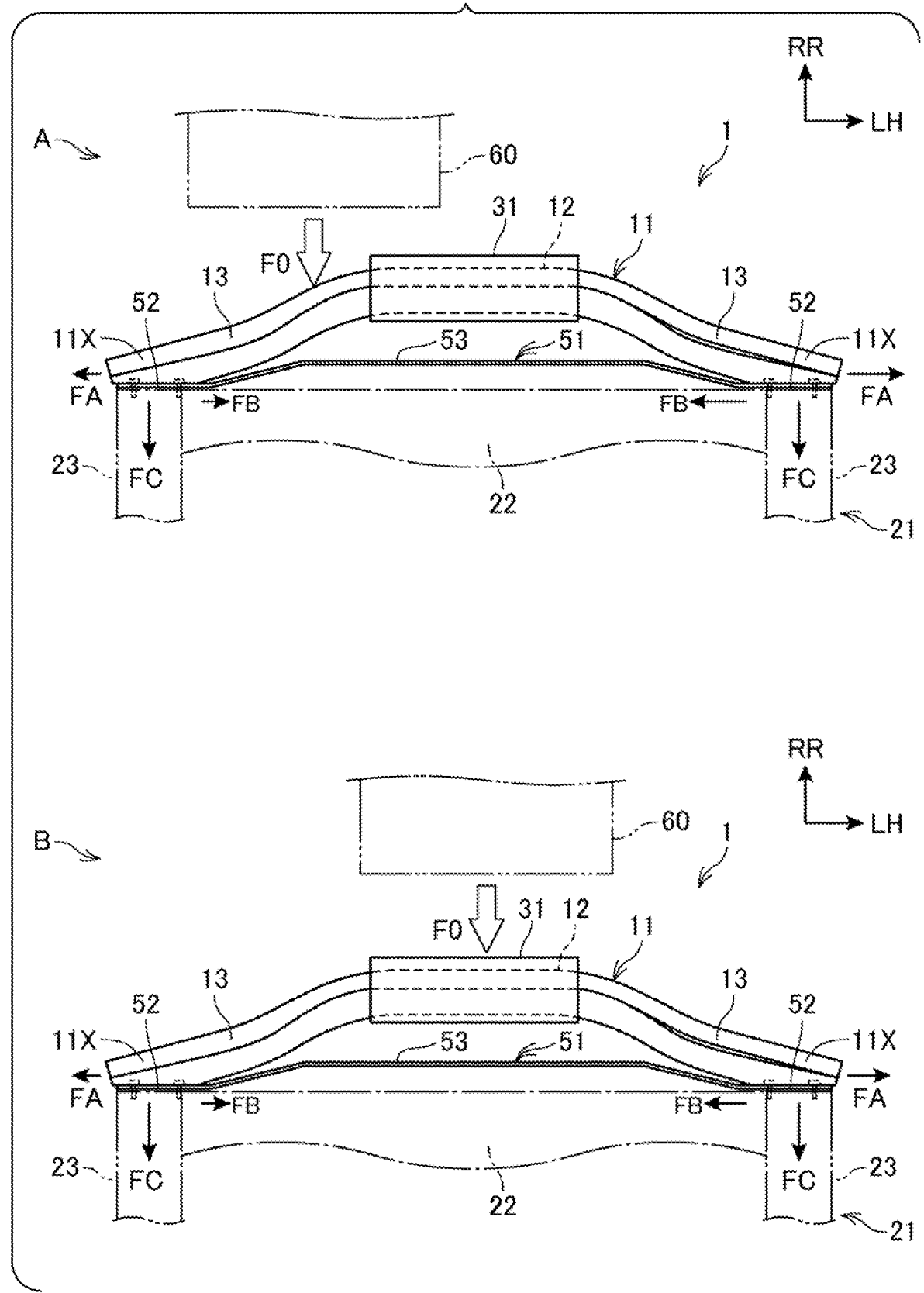
FIG. 5 is a schematic diagram of a load that acts on the bumper beam or the like by a load from behind.

Here, FIG. 5 is a schematic diagram of a load that acts on the bumper beam 11 or the like by a load F0 from behind, and a reference symbol A shows the time when the offset collision occurs and a reference symbol B shows the time when the collision from the left-right center occurs.

As indicated by the reference symbol A, at the offset collision, force FA that expands the bumper beam 11 in the left-right direction is generated by the load F0 from an object 60 behind the vehicle body. In this case, since force FB opposite to the force FA is generated by the connecting member 51, the displacement along the left-right direction corresponding to the direction where the bumper beam 11 extends can be suppressed. Since this displacement can be suppressed, a load FC due to the load F0 from the object 60 can be easily transmitted uniformly to the left and right side members 23. In addition, since the displacement of the bumper beam 11 in the left-right direction is suppressed, the excessive deformation of the bumper beam 11 can also be suppressed.

As indicated by the reference symbol B, even if an object BA behind the vehicle body collides with the left-right center, the force FA that expands the bumper beam 11 in the left-right direction may be generated in accordance with the load F0 from the object 60 behind the vehicle body. In this case, the force FB opposite to the force FA is also generated by the connecting member 51; thus, the displacement of the bumper beam 11 along the left-right direction can be suppressed. Therefore, the load FC due to the load F0 from the object 60 can be easily transmitted uniformly to the left and right side members 23, and moreover, the excessive deformation of the bumper beam 11 can also be suppressed.

Note that by adjusting at least one of the up-down length L3 and the plate thickness of the crosslinking part 53, the strength and the like of the crosslinking part 53 can be adjusted to the suitable strength and the like easily.

As illustrated in FIG. 2, the up-down length L3 of the crosslinking part 53 is set to be equal to the up-down length L1 of the bumper beam 11 and the crosslinking part 53 is disposed overlapping with the bumper beam 11 in the front-rear direction of the vehicle body; thus, the crosslinking part 53 is disposed compactly using the space behind the bumper beam 11. Note that in the present embodiment, the up-down length L3 of the crosslinking part 53 is set to be more than or equal to the up-down length L1 of the bumper beam 11 and less than the up-down length L2 of the fixing part 52; however, the present invention is not limited to this example and the up-down length L3 may be set to be less than the up-down length L1, for example.

As illustrated in FIG. 1, the crosslinking part 53 is disposed with a gap from the bumper beam 11, and moreover, has such a shape that a part of the crosslinking part 53 is offset toward the bumper beam 11. Here, in FIG. 1, the offset quantity of the crosslinking part 53 for the fixing part 52 is expressed by a value ST and the length of the offset region in the crosslinking part 53 (corresponding to the offset width) is expressed by a value WD. In addition, the tilt angle of both ends of the offset region (corresponding to the tilt angle from the fixing part 52) is expressed by an angle θX.

Since a part of the crosslinking part 53 is offset toward the bumper beam 11, the timing of obtaining the effect of suppressing the extension between the both ends 11X of the bumper beam 11 by the connecting member 51 can be delayed as compared to the case in which the part of the crosslinking part 53 is not offset.

That is to say, the crosslinking part 53 allows the outer edge parts 13 of the bumper beam 11 to deform, that is, expand to the left and right until the offset quantity of the crosslinking part 53 becomes zero. Therefore, the effect of relieving the shock just after the offset collision by the expanding deformation of the outer edge parts 13 to the left and right can be expected. When the amount of this deformation has become the degree that the offset quantity of the crosslinking part 53 becomes zero, the connecting member 51 restricts the expanding deformation of the outer edge parts 13 to the left and right. Thus, the load can be transmitted as appropriate to the left and right side members 23 and the excessive deformation of the bumper beam 11 can be suppressed.

The delay time of the timing described above can be easily adjusted by adjusting at least one of the value ST of the offset quantity and the value WD of the offset width. In addition, the delay time of the timing can also be adjusted by adjusting the angle θX. In the present embodiment, the angle θX is the angle along the connecting member 51 (particularly, the angle along the outer edge part 13).

As illustrated in FIG. 1, in the present embodiment, a part of the crosslinking part 53 is offset toward the bumper beam 11; therefore, the crosslinking part 53 can be retracted from the rear trunk space on the vehicle body frame 21 side or the space for a spare tire. Therefore, the present embodiment is advantageous in securing the rear trunk space or the space for the spare tire.

Note that when the available space exists between the crosslinking part 53 and the vehicle body frame 21, a part of the crosslinking part 53 may be offset toward the vehicle body frame 21 in the range where the rear trunk space can be secured or the space for the spare tire can be secured. The crosslinking part 53 may have such a shape that the crosslinking part 53 is bent at a plurality of places so as to have a part that is offset toward the bumper beam 11 and a part that is offset toward the vehicle body frame 21.

As illustrated in FIG. 1, a gap SM is provided between the crosslinking part 53 and the bumper beam 11; therefore, the space enough for the bumper beam 11 to be displaced can be secured and the situation where the deformation of the crosslinking part 53 is interrupted by the bumper beam 11 can be avoided easily.

Subsequently, the beam attachment body 31 is described.

As illustrated in FIG. 3, the beam attachment body 31 is formed to have a tubular shape extending to the left and right, and for example, is formed by extruding and molding a metal material such as aluminum alloy. The width of the beam attachment body 31 is set to be, for example, 25% or more and 35% or less of the width of the bumper beam 11.

The beam attachment body 31 includes a front wall 33 that faces the rear of the vehicle body, a first bottom plate 34 extending forward from a lower edge of the front wall 33, a bottom side vertical wall 35 extending upward from a front edge of the first bottom plate 34, a second bottom plate 36 extending forward from an up-down intermediate part of the bottom side vertical wall 35, and a tilt wall 37 extending obliquely rearward from a front edge of the second bottom plate 36 and connecting to an upper edge of the front wall 33. In addition, inside the beam attachment body 31, a load transmitting wall 38 extending obliquely forward and downward from an up-down intermediate part of the front wall 33 and connecting to an upper edge of the bottom side vertical wall 35, and a load absorbing wall 39 extending horizontally rearward from a front edge of the load transmitting wall 38 and connecting to the tilt wall 37 are provided.

The first bottom plate 34 and the bottom side vertical wall 35 of the beam attachment body 31 are in contact with a rear side upper wall 15 and a vertical wall 16 that form a concave part provided obliquely above the bumper beam 11, respectively. In addition, the second bottom plate 36 of the beam attachment body 31 is in contact with a front upper wall 17 extending rearward from an upper edge of the vertical wall 16 of the bumper beam 11.

The front wall 33, the first bottom plate 34, and the bottom side vertical wall 35 form a first hollow part 31C with a closed cross section, and the load absorbing wall 39, the bottom side vertical wall 35, the load transmitting wall 38, the second bottom plate 36, and the tilt wall 37 form a second hollow part 31D with the closed cross section. A border part between the upper edge of the front wall 33 and the upper edge of the tilt wall 37 is formed at a concave upper wall 31K that is depressed downward.

By this beam attachment body 31, the surface that receives the load from the object behind the vehicle body is enlarged; thus, the situation where the object goes up on the bumper beam 11 can be prevented. In addition, as illustrated in FIG. 3, the first hollow part 31C and the second hollow part 31D with the closed cross sections are formed below the beam attachment body 31; therefore, the situation where the beam attachment body 31 is deformed by the load from behind the vehicle body can be suppressed.

If the front wall 33 is pushed forward by the load, the load is transmitted to the bottom side vertical wall 35 through the load transmitting wall 38. In this case, the load directed approximately forward is applied to an upper end of the bottom side vertical wall 35 and the bottom side vertical wall 35 is rotated forward using a lower edge as an axial line, and the load absorbing wall 39, the first bottom plate 34, and the tilt wall 37 are deformed so that the second hollow part 31D is crushed; thus, the load from behind the vehicle body can be relieved or absorbed.

When the load is applied to the front wall 33, the concave upper wall 31K between the upper edge of the front wall 33 and the upper edge of the tilt wall 37 is deformed and the upper part of the front wall 33 is easily deformed. Thus, the load absorbing wall 39 is pushed forward easily as the upper part of the front wall 33 is deformed. That is to say, by the concave upper wall 31K, the load applied to the front wall 33 is easily transmitted to the load absorbing wall 39, and the load absorbing wall 39, the first bottom plate 34, and the tilt wall 37 are deformed, and the load from behind the vehicle body can be relieved or absorbed.

As described above, the vehicle body structure 1 according to the present embodiment includes the bumper beam 11 extending in the left-right direction, and the left and right side members 23 functioning as the frame member supporting the both ends 11X of the bumper beam 11. The bumper beam 11 includes the connecting member 51 that connects the both ends 11X to suppress the extension between the both ends 11X. Thus, the following effects can be obtained: when the offset collision has occurred, for example, the displacement along the left-right direction corresponding to the direction where the bumper beam 11 extends can be suppressed and the load can be easily transmitted uniformly to the left and right side members 23 by the connecting member 51, and moreover, the excessive deformation of the bumper beam 11 can be suppressed. In addition, the following effects can also be obtained: the bumper beam 11 and the connecting member 51 can be treated as one part so that the structure is simplified, and the attachment work for the vehicle body frame 21 can be simplified and the increase in number of parts and weight can be avoided easily.

The connecting member 51 is disposed between the both ends 11X of the bumper beam 11 and the side members 23; therefore, the connecting member 51 can be disposed using the space formed between the bumper beam 11 and the side members 23. Accordingly, it is unnecessary to provide an extra space especially for the connecting member 51.

In addition, since a part of the crosslinking part 53 of the connecting member 51 is offset toward the bumper beam 11 or the vehicle body frame 21, the timing of obtaining the effect of suppressing the extension between the both ends 11X of the bumper beam 11 by the connecting member 51 can be delayed.

Furthermore, since the crosslinking part 53 of the connecting member 51 is disposed with the gap SM from the bumper beam 11, the space enough for the bumper beam 11 to be displaced toward the crosslinking part 53 can be secured and the situation where the deformation of the crosslinking part 53 is interrupted by the bumper beam 11 can be avoided easily. In the present embodiment, a part of the crosslinking part 53 is offset toward the bumper beam 11 while the gap SM is sufficiently secured. Thus, the present embodiment is advantageous in securing the rear trunk space or the space for the spare tire while the space enough for the bumper beam 11 to be displaced toward the crosslinking part 53 is secured, for example.

Note that the in the above description, entire crosslinking part 53 is disposed with the gap SM from the bumper beam 11 in the present embodiment; however, the present invention is not limited to this structure and a part of the crosslinking part 53 may be brought into contact with the bumper beam 11 in the range where various effects described above can be obtained.

The connecting member 51 includes the plurality of fixing parts 52 that are fixed to the both ends 11X of the bumper beam 11, respectively, and the crosslinking part 53 that crosslinks between the fixing parts 52, and the length of each fixing part 52 (up-down length L2) is longer than the bumper beam 11 and the crosslinking part 53 in the direction orthogonal to the longitudinal direction of the bumper beam 11 (corresponding to the direction where the bumper beam 11 extends). Thus, the area to bond the bumper beam 11 can be secured easily at each fixing part 52, and it becomes easier to attach each fixing part 52 to the vehicle body frame 21 (side member 23).

Note that when the available space between the bumper beam 11 and the vehicle body frame 21 is large, the length and the shape of each part of the connecting member 51 can be changed as appropriate in accordance with the connecting structure between the fixing part 52 and the vehicle body frame 21 (side member 23) or the performance required for the connecting member 51, for example.

In the present embodiment, in the part where the left and right fixing parts 52 and the crosslinking part 53 are connected, the up-down length becomes narrower gradually toward the left-right center C1 until the up-down length becomes equal to the up-down length L3 of the crosslinking part 53; however, the shape is not limited to this shape.

In addition, since the crosslinking part 53 crosslinks between the fixing parts 52 with the smaller cross-sectional area than the fixing part 52, the part between the fixing parts 52 can be reduced in size and thus, the crosslinking part 53 can be disposed easily in the limited space between the bumper beam 11 and the vehicle body frame 21. Note that the structure is not limited to the structure in which the crosslinking part 53 has the smaller cross-sectional area than the fixing part 52, and may be changed as appropriate in accordance with the required performance or the like. For example, the crosslinking part 53 may have the cross-sectional area equivalent to that of the fixing part 52.

The vehicle body frame 21 includes the side members 23 that are disposed with a space in the left-right direction that is the extending direction of the bumper beam 11. The side members 23 extend in the front-rear direction orthogonal to the aforementioned extending direction. Since the bumper beam 11 is fixed to each side member 23 through the connecting member 51, the bumper beam 11 side does not need to have the structure for fixture to the side members 23. Moreover, in the case where the load acts on the bumper beam 11 from the outside, the load can be uniformly transmitted easily to each side member 23 through the connecting member 51.

The embodiment described above is merely one embodiment of the present invention and modifications and applications are possible arbitrarily within the range not departing from the concept of the present invention.

For example, in the above description, in the aforementioned embodiment, the present invention is applied to the vehicle body structure 1 illustrated in FIG. 1 to FIG. 3, etc.; however, the shape of each part of the vehicle body structure 1 may be changed as appropriate. For example, the plurality of places of the bumper beam 11 except the both ends 11X may be supported by the vehicle body frame 21 including the side members 23, and the connecting member 51 that connects the plurality of places to suppress the extension between the places may be integrally provided.

In the above description, the present invention is applied to the bumper structure that is provided in the rear of the vehicle body 2 of the automobile; however, the present invention may be applied to the bumper structure provided at the front of the vehicle body 2. The connecting member 51 may be provided to a door beam or the like extending in the front-rear direction instead of the bumper beam extending in the left-right direction. That is to say, in the present invention, it is only necessary to provide the connecting member that connects the plurality of places of the beam member that extends in the arbitrary predetermined direction and is supported by the vehicle body frame at these places, so as to suppress the extension between the places. The vehicle body frame in this case is not limited to the structure including the left and right side members.

Furthermore, the present invention is not limited to the vehicle body structure of the automobile and may be applied to the vehicle body structures of various known vehicles.

REFERENCE SINGS LIST

1 Vehicle body structure
2 Vehicle body
11 Bumper beam (beam member)
11X Both ends
12 Intermediate part
13 Outer edge part
21 Vehicle body frame (frame member)
22 Floor panel
23 Side member
23A Flange
31 Beam attachment body
51 Connecting member
52 Fixing part
53 Crosslinking part
54 Through hole
60 Object
C1 Left-right center of vehicle body

What is claimed is:

1. A vehicle body structure comprising a beam member extending in a predetermined direction, and a frame member supporting each of a plurality of places of the beam member, wherein the beam member includes a connecting member that connects the plurality of places to suppress extension between the places, a portion, of the connecting member, between the plurality of places is disposed with a gap from the beam member, and a part of the connecting member between the plurality of places is offset toward the beam member.

2. The vehicle body structure according to claim 1, wherein the connecting member is disposed between the places of the beam member and the frame member.

3. The vehicle body structure according to claim 1, wherein
the connecting member includes a plurality of fixing parts that are fixed to the plurality of places, respectively, and a crosslinking part that crosslinks between the fixing parts, and
a length of each fixing part is longer than the beam member and the crosslinking part in a direction orthogonal to the predetermined direction.

4. The vehicle body structure according to claim 1, wherein
the frame member includes a side member extending in a direction orthogonal to the predetermined direction, with a space in the predetermined direction, and
the beam member is fixed to the side member through the connecting member.

5. A vehicle body structure comprising a beam member extending in a predetermined direction, and a frame member supporting each of a plurality of places of the beam member, wherein the beam member includes a connecting member that connects the plurality of places to suppress extension between the places, the connecting member includes a plurality of fixing parts that are fixed to the plurality of places, respectively, and a crosslinking part that crosslinks between the fixing parts, and a length of each fixing part is longer than the beam member and the crosslinking part in a direction orthogonal to the predetermined direction.

* * * * *